(No Model.)
J. J. FAULKNER.
COTTON SEED DELINTER.
No. 546,274. Patented Sept. 10, 1895.
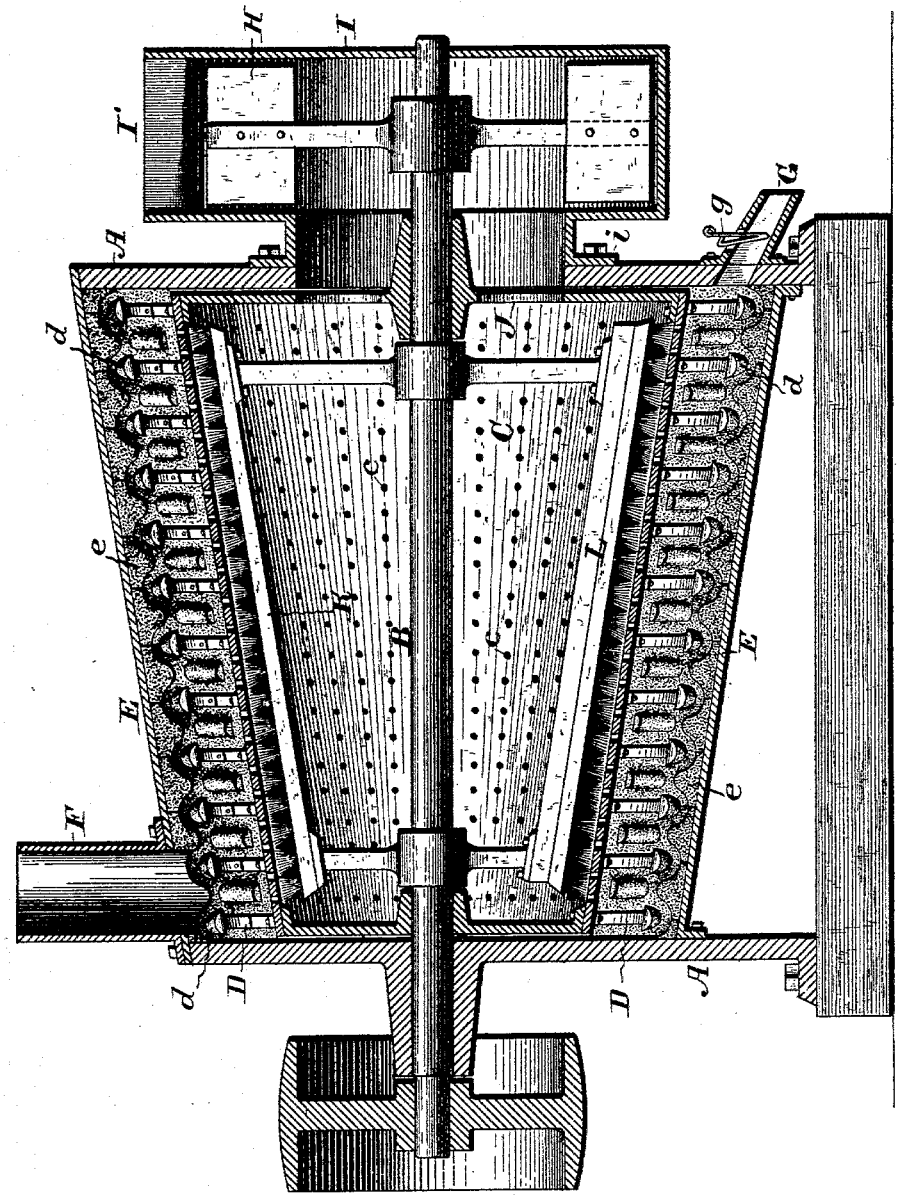
Witnesses
J. Henry Kaiser
Marie Wilson
Inventor
James J. Faulkner
By E. M. Marble Sons
Attorneys

UNITED STATES PATENT OFFICE.

JAMES J. FAULKNER, OF MEMPHIS, TENNESSEE, ASSIGNOR, BY DIRECT AND MESNE ASSIGNMENTS, TO THE STANDARD COTTON SEED COMPANY, OF ARKANSAS.

COTTON-SEED DELINTER.

SPECIFICATION forming part of Letters Patent No. 546,274, dated September 10, 1895.

Application filed June 17, 1895. Serial No. 553,116. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton-seed, and particularly to improvements in that class thereof known as "delinters;" and it consists in the improved cotton-seed delinter whose construction and arrangement of parts will be hereinafter fully described, and particularly pointed out in the claims.

The object of my present invention is to provide a cotton-seed delinter in which the lint, separated from the seed by the action of the machine, will be withdrawn through the surface of a cylinder placed centrally within an abrading-surfaced casing by the suction of an interior air-draft, and in which means will be provided for keeping the interior surface of the cylinder free from lint, so that the lint-removing action can take place without hinderance or interruption. Theoretically, as well as practically, the most available place at which to effect the removal of the lint separated from the seed is from the inner surface of the roll which the seed forms around the inner surface of the delinting-cylinder casing during the delinting operation. The reason for this is that the seed being heavier than the lint is naturally thrown by centrifugal action more closely against the surface of the casing than the lint, the seed occupying the outer face of such roll, and the lint, as rapidly as it is freed from the seed, occupying the inner face of the roll. It is not necessary to bring to bear any outside or peculiar influence to cause this arrangement of the seed and lint, as such arrangement takes place naturally from the very fact that there exists a considerable difference in specific gravity between the seed and lint. In my present machine, therefore, drawing, as I do, the lint through perforations formed in the surface of a cylinder supported within the delinting-cylinder casing, I effect the removal of the lint at the most advantageous point and keep the seed under treatment much freer from loose lint than I could by any other separating means. Cheapness of construction dictates the use of a perforated cylinder which is quite thin, as both the weight and cost of the cylinder will increase as its thickness is increased. When lint is removed through a perforated plate which is thinner than the length of the lint, there is met with, however, a serious disadvantage, which, if not overcome, will prevent the successful continuance of the lint removal. The fibers of the lint are apt under such conditions to wrap themselves on the inner surface of the perforated cylinder between adjacent perforations, thus in time clogging the perforations and preventing any further removal of lint therethrough. In my present machine I have provided means for freeing the inner surface of the perforated cylinder from lint, and use for that purpose brush-sections supported upon a central power-shaft. It is necessary in order that the action of these brushes shall be effective that they shall not move at the same rate of speed that the cylinder moves. In the construction which I now use I allow such brush-sections to have only an oscillating movement, using two diametrically opposite brush-sections, one of which is heavier than the other. The brush-sections thus used, although mounted loosely upon the power-shaft, will not rotate with the same, but will merely oscillate back and forth, freeing the inner surface of the rotating perforated cylinder from the lint and permitting the withdrawal by a central air-current of the lint as rapidly as it is removed from the seed.

My invention is fully described in the drawing which accompanies and forms a part of this application, in which the same reference-letters refer to the same or corresponding parts and in which a central section of my machine is represented.

Referring to the drawing, A represents the machine-frame. In this frame is journaled in the ordinary manner upon the central shaft B the cylinder C, which is provided with the perforations $c$, and which has secured thereto arms D, bearing on their outer ends abrading-blocks d. The casing E of the cylinder has its inner surface lined with the abrading-blocks e, the abrading action taking place between the abrading-surfaces on the casing and the abrading-blocks secured to the rotating arms. The abrading-surfaces are preferably made of emery, as that is the best as well as the cheapest material for this purpose with which I am aquainted.

The central perforated cylinder, as well as the casing therefor, is slightly conical in shape, the feed of the seed to the machine taking place through the feed-spout F, which opens into the machine at the small end of the cylinder, and the discharge of the seed taking place through the discharge-spout G, which is provided with a valve g for controlling the discharge of the seed and is situated at the bottom of the large end of the delinting-cylinder. The feed of the seed through the machine is effected by a spiral arrangement of the blocks on the casing, and a correspondingly spiral arrangement of the blocks supported by the rotating perforated cylinder. As the feed takes place it is evident that the seed will move in increasing circles. The scouring action of the machine is thereby increased and a more perfect operation insured.

The seed as soon as it is fed into the machine naturally forms a roll between the abrading-surface. The formation of the roll is due to the law of centrifugal action, and due to the operation of the same force the lint, as rapidly as it is scoured off the surface of the seed under treatment escapes to the inner surface of the roll. It has been found in practice that the lint occupies the space between the abrading-blocks supported by the central perforated cylinder and the surface of the cylinder itself. It is therefore in a position where it is most easily withdrawn from the action of the abrading-surfaces by the central air-current caused by the exhaust-fan H, which is journaled in the casing I. This casing is supported on the side of the opposite end of the delinting-cylinder casing by a holding-section i, and has free communication with the interior of the perforated cylinder through an aperture J, formed in the end of the delinting-cylinder casing. A lint-outlet is provided through an opening I', formed in the fan-casing.

If no means were provided to free the interior of the perforated cylinder from lint, the perforations in the cylinder would soon become clogged, owing to the tendency of the lint to wrap itself around adjacent perforations formed in the cylinder. To counteract this tendency, which is manifest only on the inner surface of the perforated cylinder, I journal loosely on the central power-shaft the brush-sections K and L, the brush-section L being made heavier than the brush-section K in order that the brush-sections may have no tendency to revolve with the perforated cylinder, but will either be stationary or have a slight oscillating movement. Through the action of these brushes the inner surface of the perforated cylinder is kept entirely free from lint and the complete and efficient removal of the lint separated from the seed insured.

The operation of my machine is as follows: Seed is fed into the machine through the feed-spout F and is at once subjected to the abrading action between the blocks d, supported by the revolving perforated cylinder D, and the blocks e, formed on the casing E. The lint, as rapidly as it is scoured off the surface of the seed under treatment, is drawn inward through the perforations in the rotating-cylinder C by the action of the air-current caused by the exhaust-fan H and is discharged through the opening I' formed on the fan-casing, from whence it is carried to the surface of the condenser-cylinder and formed into a bat in the usual manner. The seed itself, moving in increasing circles as it approaches the discharge end of the machine, is thoroughly scoured and its surface entirely freed from lint, the seed being finally discharged through the discharge-opening G in quantities regulated by the position of the valve g.

Having thus fully described my invention, what I claim as new, and desire to secure by Letters Patent, is—

1. In a cotton seed delinter, the combination with a cylinder having perforations formed therein, and a casing therefor, between which casing and cylinder the abrading action takes place, of means for rotating said cylinder, seed inlet and discharge openings, means for producing an interior air current for removing the lint separated by the action of the machine through the perforations in the cylinder, and means for freeing the interior surface of said cylinder from lint, substantially as described.

2. In a cotton seed delinter, the combination with a cylinder having perforations formed therein, and a casing therefor, between which casing and cylinder the abrading action takes place, of means for rotating said cylinder, seed inlet and discharge openings, means for producing an interior air current for removing the lint separated by the action of the machine through the perforations in the cylinder, and a brush for freeing the inner surface of said cylinder from lint, substantially as described.

3. In a cotton seed delinter, the combination with a cylinder having perforations formed therein, and a casing therefor, between which casing and cylinder the abrading action takes place, of means for rotating said cylinder, seed inlet and discharge openings, means for producing an interior air current for removing the lint separated by the action of the machine through the perforations in the cylinder, and a brush, mounted on a central shaft, and provided with a counterbalanced arm, for freeing the inner surface of said cylinder from lint substantially as described.

4. In a cotton seed delinter, the combination with a cylinder having perforations formed therein, and a casing therefor, between which casing and cylinder the abrading action takes place, of means for rotating said cylinder, seed inlet and discharge openings, means for producing an interior air current for removing the lint separated by the action of the machine through the perforations in the cylinder, and a brush, mounted on a central shaft, and provided with two diametrically opposite brush surfaces, one of which is heavier than the other, for freeing the inner surface of said cylinder from lint, substantially as described.

5. In a cotton seed delinter, the combination with a perforated cylinder having abrading surfaces secured thereto, and a casing therefor, between which casing and cylinder the abrading action takes place, of means for rotating said cylinder, seed inlet and discharge openings, means for producing an interior air current for removing the lint separated by the action of the machine, and means for freeing the inner surface of said cylinder from lint, substantially as described.

6. In a cotton seed delinter, the combination with a perforated cylinder, arms bearing abrading blocks secured thereto, and a casing therefor, between which casing and cylinder the abrading action takes place, of means for rotating said cylinder, seed inlet and discharge openings, means for producing an interior air current for removing the lint separated by the action of the machine, and means for freeing the inner surface of said cylinder from lint, substantially as described.

7. In a cotton seed delinter, the combination with a perforated cylinder, having abrading blocks secured thereto, and a casing therefor, between which casing and cylinder the abrading action takes place, of means for rotating said cylinder, seed inlet and discharge openings, means for producing an interior air current for removing the lint separated by the action of the machine, and means for freeing the inner surface of said cylinder from lint, substantially as described.

In testimony whereof I affix my signature in presence of two witnesses.

JAMES J. FAULKNER.

Witnesses:
   C. L. BERLIN,
   JOHN HALLUM.